C. F. WILLE.
FOUR HORSE EQUALIZER.
APPLICATION FILED MAY 18, 1910.

969,928.

Patented Sept. 13, 1910.

Witnesses:
E. F. Camp
A. R. Walton

Inventor
Christian F. Wille
By
Attys

UNITED STATES PATENT OFFICE.

CHRISTIAN F. WILLE, OF WEST ALTON, MISSOURI.

FOUR-HORSE EQUALIZER.

969,928.

Specification of Letters Patent. Patented Sept. 13, 1910.

Application filed May 18, 1910. Serial No. 562,074.

*To all whom it may concern:*

Be it known that I, CHRISTIAN F. WILLE, a citizen of the United States, residing at West Alton, in the county of St. Charles and State of Missouri, have invented certain new and useful Improvements in Four-Horse Equalizers, of which the following is a specification.

My present invention relates to draft equalizers, my object being to provide a novel and simple apparatus to distribute the load in order to attain a straight ahead pull in connection with right and left hand binders, plows and other implements of this character.

With this in view, my invention resides in the construction and arrangement to be hereinafter described, with reference to the accompanying drawings, in which—

Figure 1:
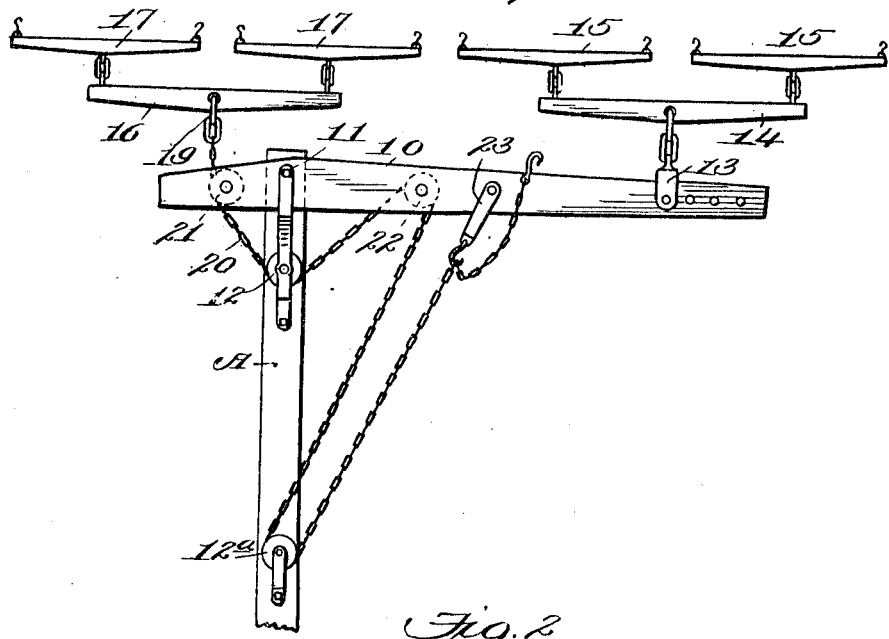
Figure 2:
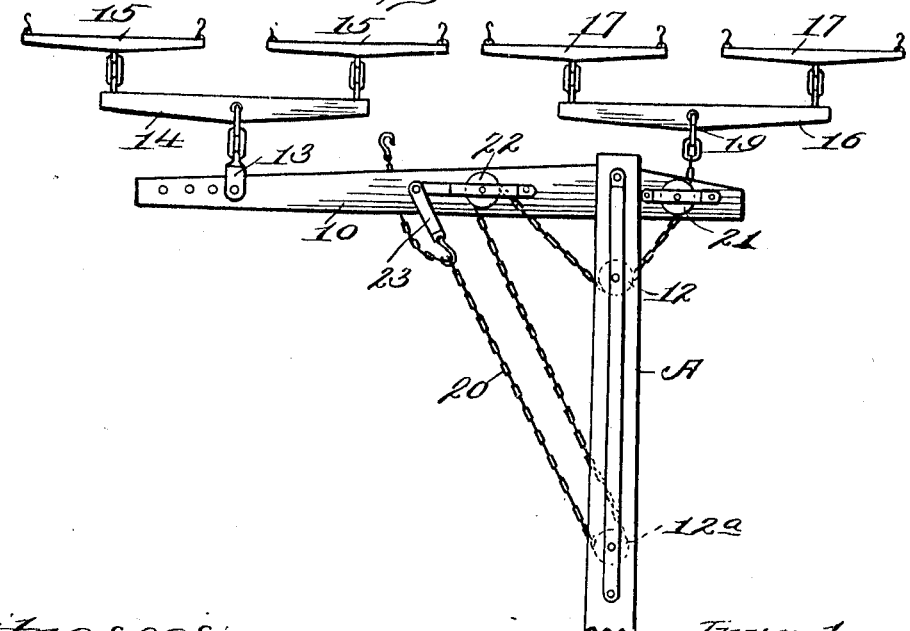

Figure 1 is a top plan view of my improved device, and Fig. 2 is a bottom plan view thereof.

Referring now to these figures, I attach an equalizing bar or beam 10, adjacent one end, to the tongue A, or other support of the implement with which it is to be used, in such manner that the long end of this beam extends to one side of the tongue or support, and the short end thereof, to the opposite, the connection being made by a vertical pin 11 upon which beam 10 is horizontally pivotally movable. The long end of the beam 10 extends to the right of the tongue with left-hand implement, and to the left of the tongue with right-hand implement. The tongue A also supports rollers or pulleys 12 and 12ª upon its upper surface, one being immediately to the rear of the beam 10 and the other (12ª) being a substantial distance to the rear of the first one.

Secured, by means of a clevis 13, to the beam 10 adjacent the extremity of its longer end, is one doubletree 14, carrying singletrees 15, the other doubletree 16, carrying swingletrees 17, having its clevis 19 connected to one end of the equalizing chain 20 at the short end of the beam 10. The beam 10 has pulleys or rollers 21 and 22 upon its lower surface, roller 21 being located upon its short end and roller 22 being located at a substantially central point thereof. The chain 20, from its end connected to the clevis 19 of doubletree 16, leads around the outside of the short end roller 21, and rearwardly around and forwardly from roller 12 of the tongue A and then forwardly around and rearwardly from the intermediate beam roller 22, to and rearwardly around the other tongue roller 12ª from which it again extends forwardly and has its end adjustably connected to a clevis 23 on beam 10 adjacent roller 22. From this it will be seen that the particular arrangement of beam 10 and its doubletree 14, and the particular arrangement of the equalizing chain 20 and its doubletree 16, serve to distribute the load in an effective manner.

I claim:

The combination with a support, of rollers mounted thereon, one to the rear of the other, a beam pivoted adjacent one end upon said support, to swing in a horizontal plane, a roller mounted adjacent the extremity of the short end of said beam, a second roller mounted thereon at a substantially central point, a doubletree clevised adjacent the extremity of the long end of said beam, an equalizing chain having one end adjustably clevised intermediately of said beam and adjacent its said intermediate roller, and passing rearwardly around the rear support roller, forwardly around the central beam roller, rearwardly around the forward support roller, and forwardly around the outside of the end beam roller, and a doubletree clevised to the free end of said chain adjacent the last named roller, all for the purpose described.

In testimony whereof I affix my signature in presence of two witnesses.

CHRISTIAN F. WILLE.

Witnesses:
J. V. MARSH,
BLANCHE HENESEY.